(12) United States Patent
Riccione et al.

(10) Patent No.: US 12,465,403 B1
(45) Date of Patent: Nov. 11, 2025

(54) AUTOMATED WIRELESS STRUT ASSEMBLY

(71) Applicant: Nicholas Riccione, Boca Raton, FL (US)

(72) Inventors: Nicholas Riccione, Boca Raton, FL (US); Matthew Neber, Miami Beach, FL (US)

(73) Assignee: Nicholas Riccione, Boca Raton, FL (US)

( * ) Notice: Subject to any disclaimer, the term of this patent is extended or adjusted under 35 U.S.C. 154(b) by 302 days.

(21) Appl. No.: 18/164,006

(22) Filed: Feb. 3, 2023

(51) Int. Cl.
*A61B 17/62* (2006.01)
*A61B 17/66* (2006.01)
*A61B 34/10* (2016.01)

(52) U.S. Cl.
CPC .............. *A61B 17/62* (2013.01); *A61B 17/66* (2013.01); *A61B 34/10* (2016.02); *A61B 2034/107* (2016.02)

(58) Field of Classification Search
CPC .............................................. A61B 17/60–666
See application file for complete search history.

(56) References Cited

U.S. PATENT DOCUMENTS

| | | | |
|---|---|---|---|
| 4,308,863 A * | 1/1982 | Fischer | A61B 17/62 606/56 |
| 4,615,338 A * | 10/1986 | Ilizarov | A61B 17/62 606/58 |
| 4,768,524 A * | 9/1988 | Hardy | A61B 17/62 606/54 |
| 5,062,844 A | 11/1991 | Jamison et al. | |
| 5,180,380 A * | 1/1993 | Pursley | A61B 17/7216 606/56 |
| 8,157,800 B2 * | 4/2012 | Vvedensky | A61B 17/66 606/57 |
| 8,282,652 B2 * | 10/2012 | Mackenzi | A61B 17/66 606/105 |
| 8,439,914 B2 | 5/2013 | Ross et al. | |
| 8,702,705 B2 | 4/2014 | Ziran et al. | |
| 8,864,750 B2 * | 10/2014 | Ross | B25B 23/14 606/1 |
| 9,044,271 B2 | 6/2015 | Edelhauser et al. | |
| 9,155,559 B2 | 10/2015 | Ross et al. | |
| 9,204,937 B2 | 12/2015 | Edelhauser et al. | |
| 9,642,649 B2 * | 5/2017 | Nikonovas | G16H 20/40 |
| 9,895,167 B2 | 2/2018 | Edelhauser et al. | |
| 10,010,350 B2 | 7/2018 | Mannanal et al. | |

(Continued)

*Primary Examiner* — Eduardo C Robert
*Assistant Examiner* — Steven J Cotroneo
(74) *Attorney, Agent, or Firm* — Albert Bordas, Esq.

(57) ABSTRACT

An automated wireless strut assembly having a lead assembly, a control assembly coupled to the lead assembly, and a computer device. The lead assembly has a locking sleeve, a lead screw, a rod lower section, a lead nut chassis, an upper clevis, and first and second connectors. The control assembly has a main housing with a cover that houses a circuit assembly, a motor, a main coupling, a bearing, a main chassis, and a battery. The circuit assembly has an angular position sensor. The lead screw is driven by the motor to control the distance between the first and second connectors by engaging the lead nut chassis. The circuit assembly is wirelessly connected to the computer device, whereby the angular position sensor allows to automatically control the adjustment of the distance between the first and second connectors.

21 Claims, 11 Drawing Sheets

(56) References Cited

U.S. PATENT DOCUMENTS

| | | | |
|---|---|---|---|
| 10,082,384 B1 | 9/2018 | Singh | |
| 10,368,913 B2 | 8/2019 | Mannanal et al. | |
| 10,470,800 B2 | 11/2019 | Bordeaux et al. | |
| 10,856,908 B2* | 12/2020 | Mullaney | A61B 17/62 |
| 11,334,997 B2 | 5/2022 | Gutmann et al. | |
| 11,337,732 B2 | 5/2022 | Lavi et al. | |
| 11,911,074 B2* | 2/2024 | Heotis | A61B 17/62 |
| 2010/0331840 A1 | 12/2010 | Ross et al. | |
| 2011/0208187 A1 | 8/2011 | Wong | |
| 2015/0080892 A1* | 3/2015 | Lehmann | A61B 17/66 |
| | | | 606/57 |
| 2016/0022314 A1* | 1/2016 | Bordeaux | A61B 17/66 |
| | | | 606/56 |
| 2017/0277859 A1* | 9/2017 | Burgherr | A61B 90/98 |
| 2017/0354439 A1 | 12/2017 | Mannanal et al. | |
| 2018/0055569 A1 | 3/2018 | Wahl et al. | |
| 2021/0027879 A1* | 1/2021 | Noblett | A61B 17/66 |
| 2021/0361322 A1* | 11/2021 | Sun | A61B 17/66 |
| 2023/0008535 A1* | 1/2023 | Janna | H05K 1/148 |
| 2023/0023669 A1* | 1/2023 | Noblett | A61B 34/10 |
| 2024/0325086 A1* | 10/2024 | Kumar | A61B 34/10 |

* cited by examiner

AUTOMATED WIRELESS STRUT ASSEMBLY

BACKGROUND OF THE INVENTION

Field of the Invention

The present invention relates to strut assemblies, and more particularly, to a wireless strut assembly.

Description of the Related Art

Applicant believes that one of the closest references corresponds to U.S. Pat. No. 10,470,800 B2 issued to Bordeaux, et al. on Nov. 12, 2019, for External bone fixation device. However, it differs from the present invention because Bordeaux, et al. teach an external bone fixation device configured to correct bone deformities or repair bone injuries. The device can include a plurality of bases configured to be attached to portions of a bone and a plurality of struts configured to be adjustable in length to change the position and orientation of the plurality of bases and the attached bone portion.

Applicant believes that another reference corresponds to U.S. U.S. Pat. No. 11,337,732 B2 issued to Lavi, et al. on May 24, 2022, for Point and click alignment method for orthopedic surgeons, and surgical and clinical accessories and devices. However, it differs from the present invention because Lavi, et al. teach a point and click method for positioning an external fixator on a patient, in which a surgeon using a computer mouse or similar device inscribes lines or points on a computer screen displaying an x-ray or other photographic image of the bones of a patient together with two rings in position adjacent the bones. By inscribing lines on the computer screen, the underlying drawings program detects the x-y coordinates of any point on the screen when the user (the surgeon or other practitioner) clicks on it, and outputs the x-y coordinates of every point identified by the user including the two points defining any desired line. The practitioner thus can, using "point and click" operation, govern the repositioning of two fixator rings on the bones of a patient.

Applicant believes that another reference corresponds to U.S. U.S. Pat. No. 10,010,350 B2 issued to Mannanal, et al. on Jul. 3, 2018, for Gear mechanisms for fixation frame struts. However, it differs from the present invention because Mannanal, et al. teach an adjustable length strut, which includes two joints, a lead screw extending between the joints, and a tube adapted to receive the lead screw. An actuation mechanism with gear teeth extending radially outward of the strut axis is rotatably fixed to the lead screw. A protrusion may be coupled to an end of the lead screw by a rotatable collar, with the protrusion extending through a slot in the tube to mark the length of the strut. A modular attachment member may be adapted to be couple to the first joint and include a worm gear adapted to engage gear teeth of the actuation mechanism. The modular attachment member may include a radiofrequency identity tag mechanism adapted to be read by a tag reader of a tool, the tool adapted to couple to the attachment member to rotate the worm gear to increase or decrease the effective length of the strut.

Applicant believes that another reference corresponds to U.S. U.S. Pat. No. 9,155,559 B2 issued to Ross, et al. on Oct. 13, 2015, for External fixator strut. However, it differs from the present invention because Ross, et al. teach an external fixation strut for an external fixation device having ball joints that can be attached to the outer or inner surface of the ring and locked to increase overall stability of the external fixation device. Some embodiments of the fixation strut include a first ball joint coupled to a first end portion of a strut housing, the strut housing having an axial bore defined therethrough. A second ball joint is coupled to a second end portion of an elongated member. The elongated member is coupled to an adjustment mechanism, which is coupled to an upper end portion of an adjustment sleeve. The adjustment sleeve is slidably disposed in the axial bore of the strut housing and is used to effect coarse strut length adjustments.

Applicant believes that another reference corresponds to U.S. U.S. Pat. No. 8,702,705 B2 issued to Ziran, et al. on Apr. 22, 2014, for Electromechanically driven external fixator and methods of use. However, it differs from the present invention because Ziran, et al. teach a device for electromechanically and/or electro-pneumatically positioning a fractured bone having a first clamping unit adapted for attachment to the bone by at least one first bone fastener, a second clamping unit adapted for attachment to the bone by at least one second bone fastener, and at least one of: (i) a translation component operatively driven by a translational driver for relative translational movement of one clamping unit with respect to the other along a translational axis; (ii) an angulation component operatively driven by an angulational driver for relative angulational movement of one clamping unit with respect to the other along an articulation axis; and (iii) a rotational component operatively driven by a rotational driver for relative rotational movement of one clamping unit with respect to the other along a rotational axis.

Applicant believes that another reference corresponds to U.S. U.S. Pat. No. 8,282,652 B2 issued to Mackenzi, et al. on Oct. 9, 2012, for Force-controlled autodistraction. However, it differs from the present invention because Mackenzi, et al. teach a distractor coupled to first and second fixators, which are coupled to first and second portions of the bone, respectively, on opposite sides of an osteotomy of the bone. A motor produces a motion of the first fixator relative to the second fixator such that the first portion of the bone is distracted from the second portion of the bone. A force sensor measures a resistant force to the motion, and a distractor displacement sensor measures a distractor displacement. A controller is operably coupled to the force sensor, the distractor displacement sensor, and the motor. The controller is configured to determine a variable limb stiffness using the resistant force, the distractor displacement, and a known distractor stiffness of the distractor, and to adjust a gain of the motor such that the variable limb stiffness matches a desired limb stiffness.

Applicant believes that another reference corresponds to U.S. U.S. Pat. No. 9,044,271 B2 issued to Edelhauser, et al. on Jun. 2, 2015, for External fixation system. However, it differs from the present invention because Edelhauser, et al. teach an external fixation system comprising first and second planar at least part-circular ring elements, the first ring element having a circumferential track extending along the part-circular circumference thereof; a plurality of struts each having a first and second end, the first end of each strut coupled to the first ring by a first connector and the second end of each strut coupled to a second ring by a second connector, the first connector including a spherical joint; the second connector non-rotatably coupled to the second ring, the strut second end being coupled to the second connector by a U-joint; shuttles mounted on the track of the first ring for movement there along with one shuttle coupled to each strut; and means for controlling the angular position of each strut second end and means for controlling the position of each shuttle along the circumferential track on the first ring.

Applicant believes that another reference corresponds to U.S. Pat. No. 5,180,380 A issued to Pursley, et al. on Jan. 19, 1993, for Automatic compression-distraction-torsion method and apparatus. However, it differs from the present invention because Pursley, et al. teach an orthopedic system, which includes a plurality of support members, a plurality of rods interconnecting the support members, a plurality of pins attached to the support members for passing through bone of a patient, and an automatic drive device to control an adjustment mechanism of the rods to adjust the rod length of the rods to alter the relative positions of the support members. The drive device includes at least one motor for incrementally adjusting the adjustment mechanism of at least one of the rods and a controller device for providing pulses to the motor and for storing information regarding the number of stepwise adjustments of the rod length by the motor.

Applicant believes that another reference corresponds to U.S. U.S. Pat. No. 11,334,997 B2 issued to Gutmann, et al. on May 17, 2022, for Hinge detection for orthopedic fixation. However, it differs from the present invention because Gutmann, et al. teach images displayed of anatomical structure segments with an attached fixator. Indications may be received of first image hinge locations of a plurality of hinges of the fixator in the first image. Projected second image hinge locations may be determined based at least in part on the first image hinge locations. Hinge candidates may be detected in the second image having shapes associated with the plurality of hinges. The hinges candidates may be detected by computer software using automated software-based image analysis techniques. Adjusted second image hinge locations may then be calculated based at least in part on the projected second image hinge locations and candidate second image hinge locations. The adjusted second image hinge locations may be used to determine physical locations of the fixator and anatomical structure segments in three-dimensional space, which may be used to determine manipulations to the fixator for deformity correction.

Applicant believes that another reference corresponds to U.S. U.S. Pat. No. 10,368,913 B2 issued to Mannanal, et al. on Aug. 6, 2019, for Adjustment instrument with tactile feedback. However, it differs from the present invention because Mannanal, et al. teach an external fixation frame system that includes a first ring, a second ring, and at least three struts configured to couple the first ring to the second ring, each strut having a rotatable head portion and a counter torque portion. The system may also include an adjustment tool that includes a driver portion having an inner engagement portion for engaging the head portion of the strut, an outer engagement portion for engaging the counter torque portion of the strut, and a feedback mechanism rotatably coupled to the inner and outer engagement portions. The tool may further include a plunger having an inner portion positioned at least partially within the inner engagement portion, and an outer portion positioned at least partially between the inner engagement portion and the outer engagement portions, the plunger being axially translatable with respect to the inner and outer engagement portions.

Applicant believes that another reference corresponds to U.S. U.S. Pat. No. 9,204,937 B2 issued to Edelhauser, et al. on Dec. 8, 2015, for Software for use with deformity correction. However, it differs from the present invention because Edelhauser, et al. teach a software used in planning the correction of bone deformities preoperatively or postoperatively, and in particular relates to virtually manipulating rings and struts of an external fixation frame in order to plan the steps for making a desired correction to two or more bone portions of a patient. The software can be used prior to surgery, allowing a user to virtually define a bone deformity, and virtually add and manipulate fixation rings and struts to the bone deformity. Based on the virtual manipulations, a correction plan can be generated that describes length adjustments that should be made to the plurality of model struts over a period of time to correct the bone deformity. The software can also be used after surgical fixation of the fixation frame and struts to the deformed bone.

Applicant believes that another reference corresponds to U.S. Pat. No. 9,895,167 B2 issued to Edelhauser, et al. on Feb. 20, 2018, for Ring hole planning for external fixation frames. However, it differs from the present invention because Edelhauser, et al. teach an external fixation system that includes first and second fixation members having first and second pluralities of mounting holes, respectively. The first and second plurality of holes are configured to receive first and second ends of a plurality of struts, each strut having a default or initial mounting position. A simulation of the correction may be performed with the struts in the default positions, but it May be determined that the correction is not achievable. Additional simulations of the correction may be performed with the ends of the struts in different mounting positions to determine if other mounting positions of the struts allow the correction to be completed. During the correction, if one of the struts reaches a maximum length, it May be disconnected and reconnected to a different mounting hole so that, after being reconnected, the strut may be further increased in length to continue the correction.

Applicant believes that another reference corresponds to U.S. U.S. Pat. No. 10,082,384 B2 issued to Singh on Sep. 25, 2018, for Systems and methods for detecting fixation frame parameters. However, it differs from the present invention because Singh teaches a detection device, such as a camera-enabled smart phone, which may be used to take one or more pictures of an external fixation frame attached to a patient. The pictures may be transmitted to a computer system accessible by the patient's physician. The computer system may uniquely identify each strut of the external fixation frame and determine the length of each strut. The computer system May compare the determined length of each strut to a planned length of the struts for a particular time interval as outlined in a correction plan. If the struts are the correct length for the particular time interval, the fact may be indicated to the physician and transmitted to the patient. If the struts are not the correct length, the computer system May update the correction plan to account for the discrepancy plan, with the updated correction plan transmitted to the patient.

Applicant believes that another reference corresponds to U.S. U.S. Pat. No. 5,062,844 A issued to Jamison, et al. on Nov. 5, 1991, for Method and apparatus for the fixation of bone fractures, limb lengthening and the correction of deformities. However, it differs from the present invention because Jamison, et al. teach a method and apparatus for the fixation of bone fractures, limb lengthening, and the correction of deformities, which uses an improved composite plastic carbon fiber ring that is formed in a mold or machined with a stepped end portion that allows half rings to be assembled in a common plane. The method can use a mold wherein multiple rings can be formed by stacking the rings with a Teflon layer therebetween and wherein circumferential braid reinforcement of carbon fiber adds strength at the circumferential inner and outer curved surfaces of the rings and half rings.

Applicant believes that another reference corresponds to U.S. U.S. Pat. No. 8,439,914 B2 issued to Ross, et al. on May 14, 2013, for External fixation strut. However, it differs from the present invention because Ross, et al. teach an external fixation strut for an external fixation device having a ball joint that can be attached to the outer or inner surface of the ring and locked to increase overall stability of the external fixation device. Some embodiments of the fixation strut include a first ball joint coupled to a first end portion of a strut housing, the strut housing having an axial bore defined therethrough. A second ball joint is coupled to a second end portion of a threaded elongated member. The threaded elongated member is threadably coupled to an adjustment mechanism, which is rotatably coupled to an upper end portion of an adjustment sleeve. The adjustment sleeve is slidably disposed in the axial bore of the strut housing and is used to effect coarse strut length adjustments.

Applicant believes that another reference corresponds to U.S. Patent Application Publication No. 2017/0354439 A1, published on Dec. 14, 2017, to Mannanal, Subash K., et al. for Gear mechanisms for fixation frame struts. However, it differs from the present invention because Mannanal, Subash K.; et al. teach an adjustable length strut including two joints, a lead screw extending between the joints, and a tube adapted to receive the lead screw. An actuation mechanism with gear teeth extending radially outward of the strut axis is rotatably fixed to the lead screw. A protrusion may be coupled to an end of the lead screw by a rotatable collar, with the protrusion extending through a slot in the tube to mark the length of the strut. A modular attachment member may be adapted to be couple to the first joint and include a worm gear adapted to engage gear teeth of the actuation mechanism. The modular attachment member may include a radiofrequency identity tag mechanism adapted to be read by a tag reader of a tool, the tool adapted to couple to the attachment member to rotate the worm gear to increase or decrease the effective length of the strut.

Applicant believes that another reference corresponds to U.S. Patent Application Publication No. 2021/0361322 A1, published on Nov. 25, 2021, to Tao Sun for Automatic recognition method for spatial position and pose of parallel external fixator for fracture reduction. However, it differs from the present invention because Sun teaches an automatic recognition method for spatial position and pose of parallel external fixator, including the following steps of: installing three markers on each of the two fixation rings of the parallel external fixator; obtaining 3D images of six marker balls after scanning and reconstruction by a common 3D clinical imaging system; recognizing the sphere center coordinates of the six marker balls by sphere fitting algorithm; according to the mounting configuration of the markers on the two fixation rings, establishing coordinate systems of two fixation rings and determining the spatial position and pose of the external fixator; in addition, by obtaining the 3D images of the fracture bone segments with the 3D clinical imaging system and simulating the movement of the fracture deformity correction, the adjustment schedule of the external fixator struts can be achieved.

Applicant believes that another reference corresponds to U.S. Patent Application Publication No. 2011/0208187 A1, published on Aug. 25, 2011, to Wong, Kian-Ming for Orthopedic external fixation device. However, it differs from the present invention because Wong teaches a telescopically adjustable strut for use with orthopedic external fixators, which has a first end and a second end and includes a universal-hinged connector provided at each of the first and second ends for connecting the strut to orthopedic external fixator base members. The universal-hinged connector is configured and adapted for pivoting the strut relative to the base members and to lock the universal-hinged connector at a desired angle.

Applicant believes that another reference corresponds to U.S. Patent Application Publication No. 2018/0055569 A1, published on Mar. 1, 2018, to Wahl Michael; et al. for Orthopedic fixation control and manipulation. However, it differs from the present invention because Wahl Michael, et al. teach a fixation apparatus may be attached to first and second anatomical structure segments. Images of the fixation apparatus and the attached anatomical structure segments may then be captured. In some examples, the images need not necessarily be orthogonal with respect to one another. Configuration information associated with the fixation apparatus may then be received. Additionally, first image information may be received, for example including indications of one or more locations, within the images, of at least part of one or more elements of the fixation apparatus. Additionally, second image information may be received, for example including indications of one or more locations, within the images, of at least part of the first and the second anatomical structure segments. Manipulations to the fixation apparatus for correction of the anatomical structure deformity May then be determined, and indications of the determined manipulations may then be provided to one or more users.

Applicant believes that another reference corresponds to U.S. Patent Application Publication No. 2010/0331840 A1, published on Feb. 12, 2009, to John D, et al. for Fast adjust external fixation connection rod. However, it differs from the present invention because John D., et al. teach an external fixation connection rod having articulatable joints that can be attached to external supports, such as rings. In some embodiments, the fixation connection rod includes a telescopic rod and connecting mechanisms for coupling the joints of the connection rod to the external supports, and the connecting mechanisms are operable to substantially lock the orientation of the joints. In some other embodiments, the connection rod includes a housing having parallel axial bores defined therethrough and sleeves slidably disposed in the axial bores.

Other patents describing the closest subject matter provide for a number of more or less complicated features that fail to solve the problem in an efficient and economical way. None of these patents suggest the novel features of the present invention.

SUMMARY OF THE INVENTION

The present invention is an automated wireless strut assembly comprising a lead assembly having a locking sleeve and a lead screw that passes through the locking sleeve. The automated wireless strut assembly further comprises a control assembly coupled to the lead assembly, wherein the control assembly comprises a circuit assembly.

The lead assembly further comprises a rod top end, a rod lower section, a lead nut chassis having chassis holes, a lead nut member, an upper clevis, a detent bearing, first and second retaining rings, and a spring. The upper clevis receives the detent bearing and the lead nut chassis. The locking sleeve attaches to the upper clevis. A first connector is connected to the upper clevis.

The locking sleeve receives the spring and a section of the lead nut chassis, whereby the locking sleeve comprises first and second holes and first and second apertures to receive the first and second lead nut members respectively. The locking sleeve attaches to the upper clevis.

The lead assembly further comprises a threaded rod having first and second index, an internal rod, and an end stop. The control assembly comprises a main housing and a cover defining first and second holes. The main housing with the cover houses a motor, a main coupling, a bearing, a main chassis, and a battery.

The circuit assembly comprises an angular position sensor. The main chassis comprises first and second cavities, and a lower clevis that connects a second connector. The first cavity receives the motor.

The control assembly is coupled to the lead assembly, whereby the second cavity receives the rod lower section, and the lead screw protrudes from the main housing through the first hole.

The rod lower section passes through the main coupling and the bearing, whereby the second cavity receives the bearing with the rod lower section.

The upper clevis connected to the first connector and the lower clevis connected to the second connector can be aligned with the center axis of the lead screw or off-axis with respect to the center axis of the lead screw.

The lead screw is driven by the motor to control the distance between the first and second connectors by engaging the lead nut chassis. The circuit assembly controls the movements of the lead screw.

The angular position sensor is mounted axially at a lower extremity of the main coupling to measure an angular position of the lead screw at the rod lower section.

The angular position sensor allows to automatically control the adjustment of the distance between the first and second connectors. A computer device automatically connects to the lead assembly through the circuit assembly.

The lead assembly is programed through the computer device to make scheduled adjustments automatically for at least 60 days.

A set of the strut assemblies having the control assembly are connected to first and second rings of an external fixation system through respective first and second connectors, building a wireless independent networking schema for monitoring and self-management of the strut assemblies on the external fixation system.

The computer device comprises an executable application, which automatically connects to the strut assembly through the circuit assembly to program the strut assembly.

A set of strut assemblies having the control assembly are connected to first and second rings of an external fixation system through respective first and second connectors, building an intelligent mesh networking schema for monitoring and self-management of the strut assemblies on the external fixation system.

The automated wireless strut assembly further comprises a bridge device for remote connectivity between the computer device and the strut assembly.

The computer device comprises an executable application having a distraction file containing instructions for entire spatial movements, wherein the distraction file is automatically separated into individual movements of the strut assembly and stored for each circuit assembly.

It is therefore one of the main objects of the present invention to provide an automated wireless strut assembly.

It is another object of this invention to provide an automated wireless strut assembly to implement a proprietary intelligent networking schema for monitoring and self-management of the system.

It is another object of this invention to provide an automated wireless strut assembly, which contains memory for network management and autonomous execution of the program or instruction set.

It is another object of this invention to provide an automated wireless strut assembly, which is built for easy installation/replacement.

It is another object of this invention to provide an automated wireless strut assembly, which has both automatic and manual operation.

It is another object of this invention to provide an automated wireless strut assembly, which is easily programable for each patient by a surgeon, on a case-by-case basis.

It is another object of this invention to provide an automated wireless strut assembly, which has no visible wiring or wired connections to other devices.

It is another object of this invention to provide an automated wireless strut assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1A:
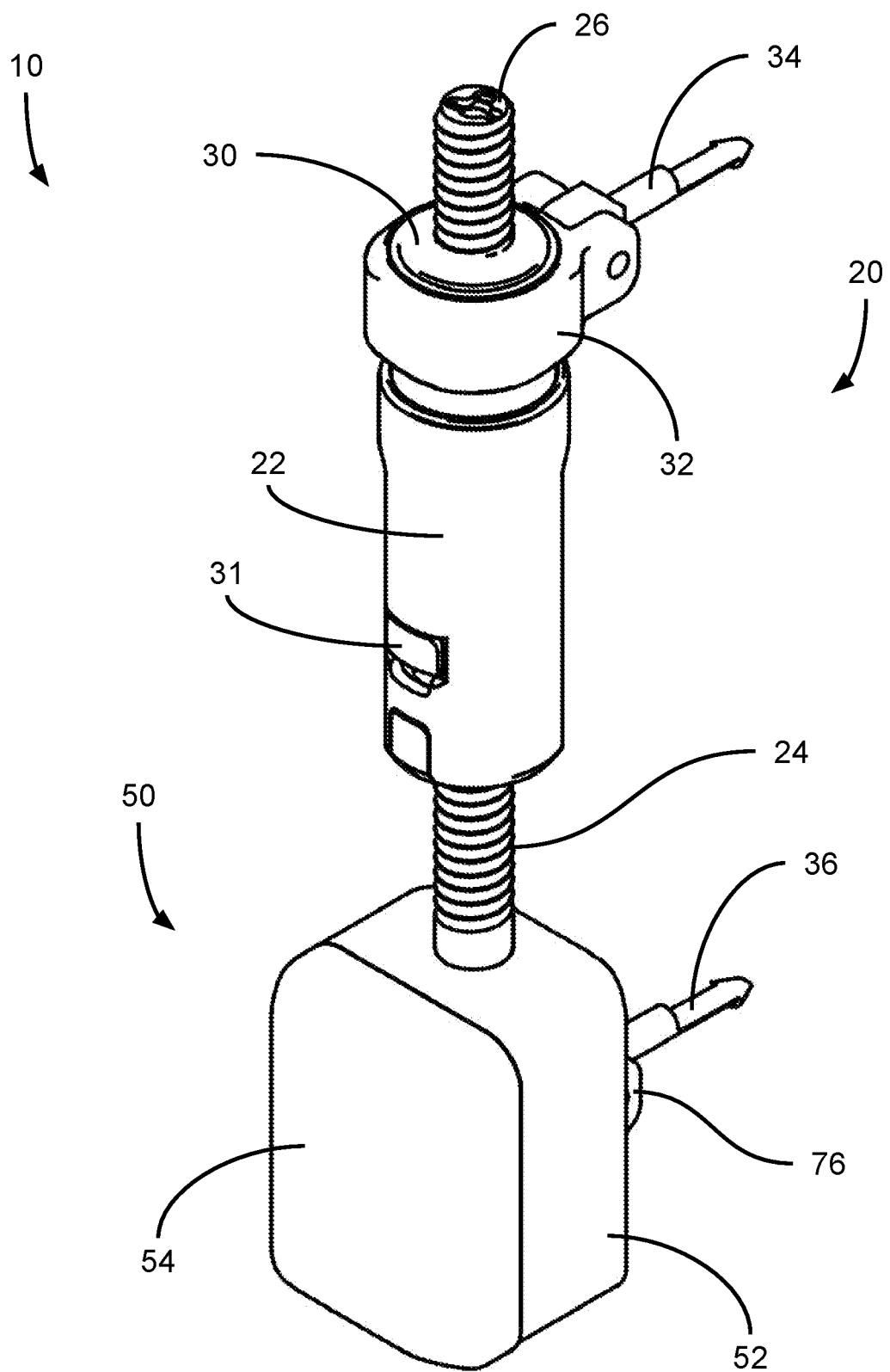
FIG. 1A is an isometric view of present invention.

Referring now to the drawings, the present invention is an automated wireless strut assembly, hereinafter referred to with numeral 10 or as strut assembly 10. It can be observed that it basically includes lead assembly 20 and control assembly 50.

Figure 1B:
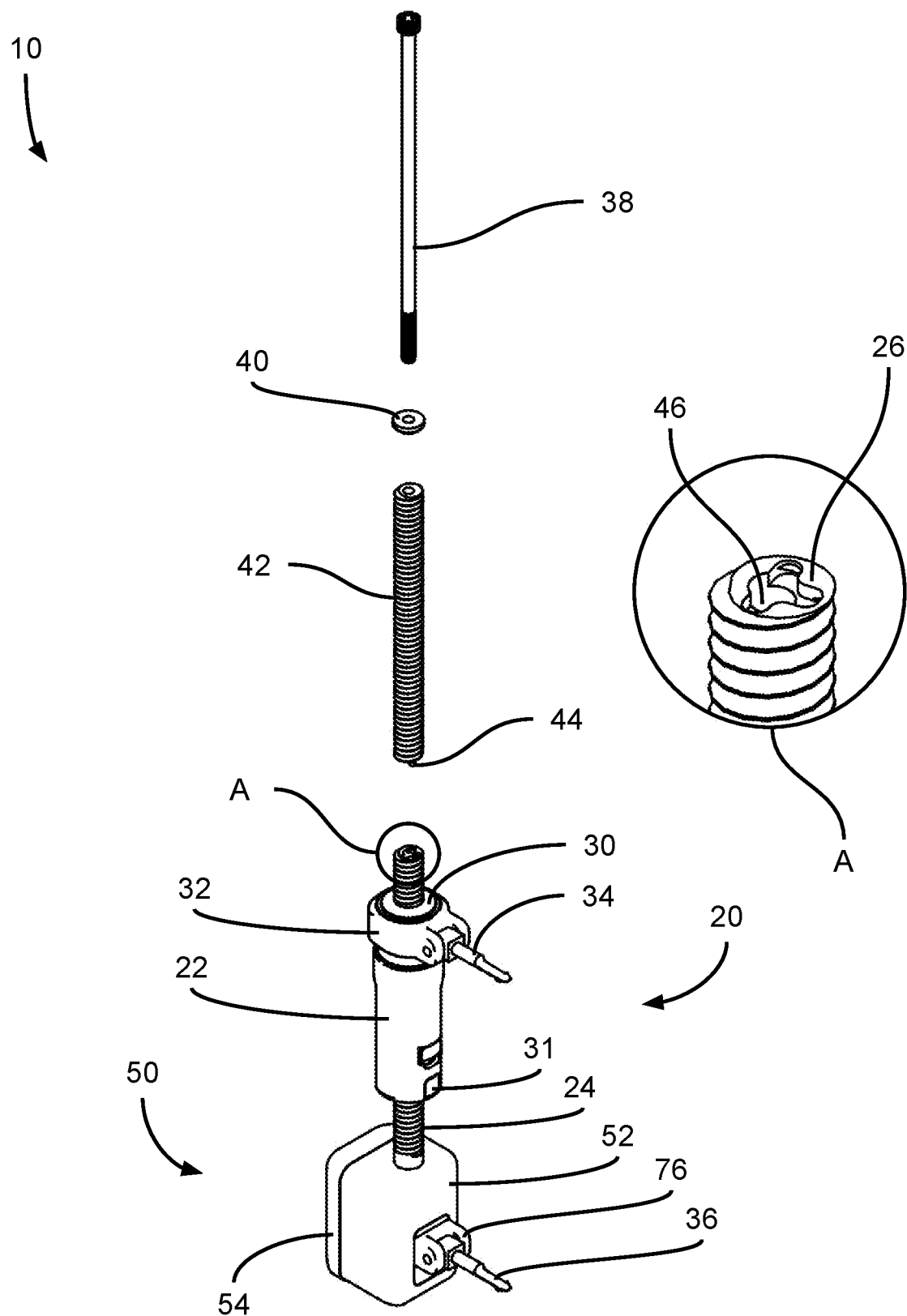
FIG. 1B is an isometric view of an alternative embodiment of the present invention having an extension for the lead screw, and showing an enlarged view representing portion A.

As seen in FIGS. 1A and 1B, control assembly 50 is coupled to lead assembly 20. Lead assembly 20 comprises locking sleeve 22, lead screw 24, retaining rings 25, rod top end 26, rod lower section 28, seen in FIG. 2, lead nut chassis 30, upper clevis 32, and first and second connectors 34 and 36. Lead nut chassis 30 comprises chassis holes 29.

In an alternative embodiment, lead assembly 20 may comprises threaded rod 42 having internal rod 38, end stop 40, and first and second index 44 and 46. Threaded rod 42 allows to extend lead screw 24 if is needed.

Figures 1C, 1D:
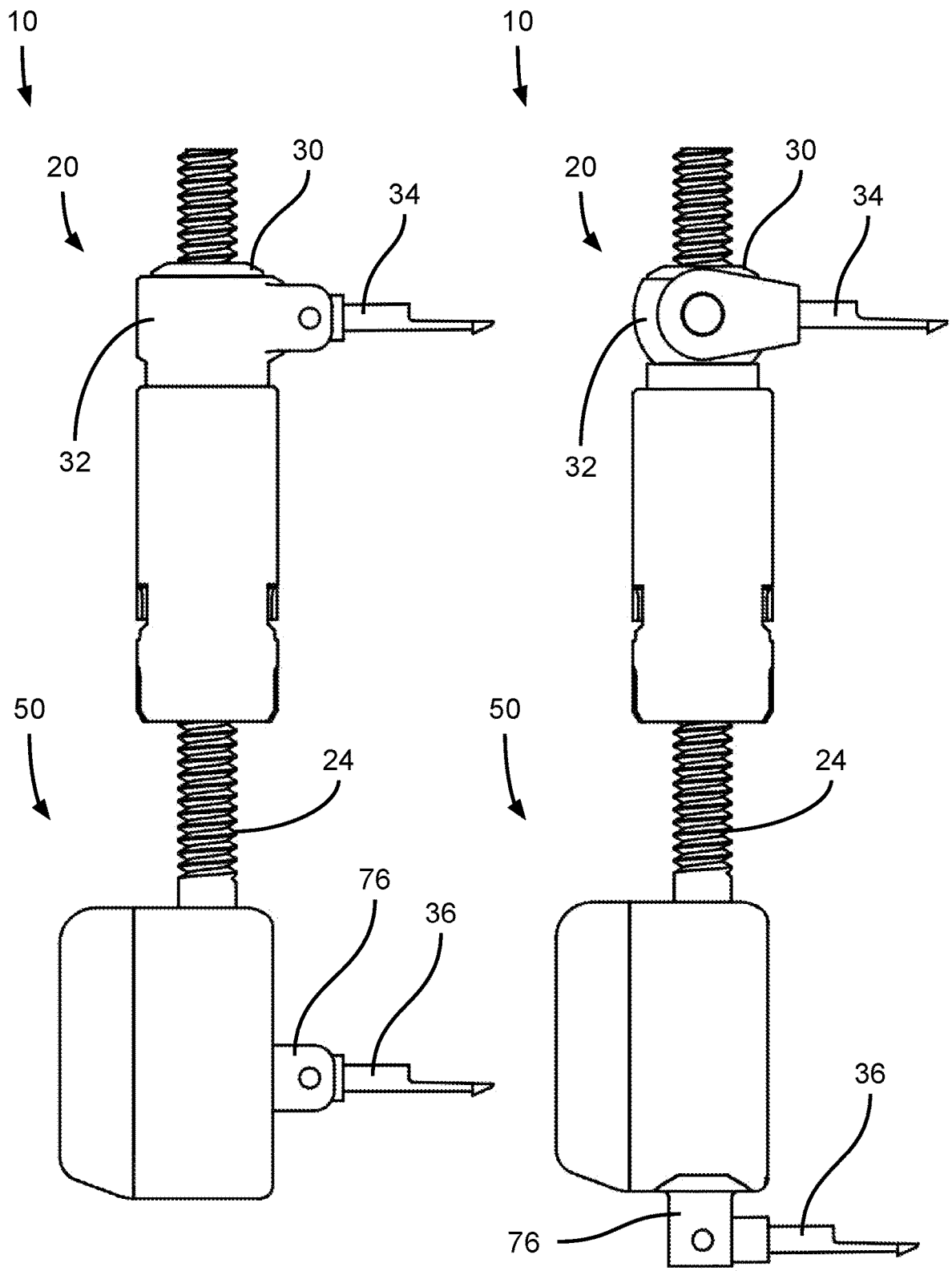
FIG. 1C is a side view of the present invention showing connectors in an off-axis configuration.
FIG. 1D is a side view of an alternative embodiment of the present invention showing the connectors in an on-axis configuration.

As seen in FIGS. 1C and 1D, in one embodiment, the rotational points between upper clevis 32 and connector 34, and lower clevis and connector 36 has an off-axis location with respect to lead screw 24, seen in FIG. 1C. In another embodiment, as seen in FIG. 1D, the rotational points between upper clevis 32 and connector 34, and lower clevis 76 and connector 36 are aligned with the center axis of lead screw 24.

The benefits of the off-axis embodiment are an increased range of motion for the strut articulation and clearance around the spatial frame. The benefit of the on-axis embodiment is the strength due to load forces being aligned with lead screw 24.

Figure 2:
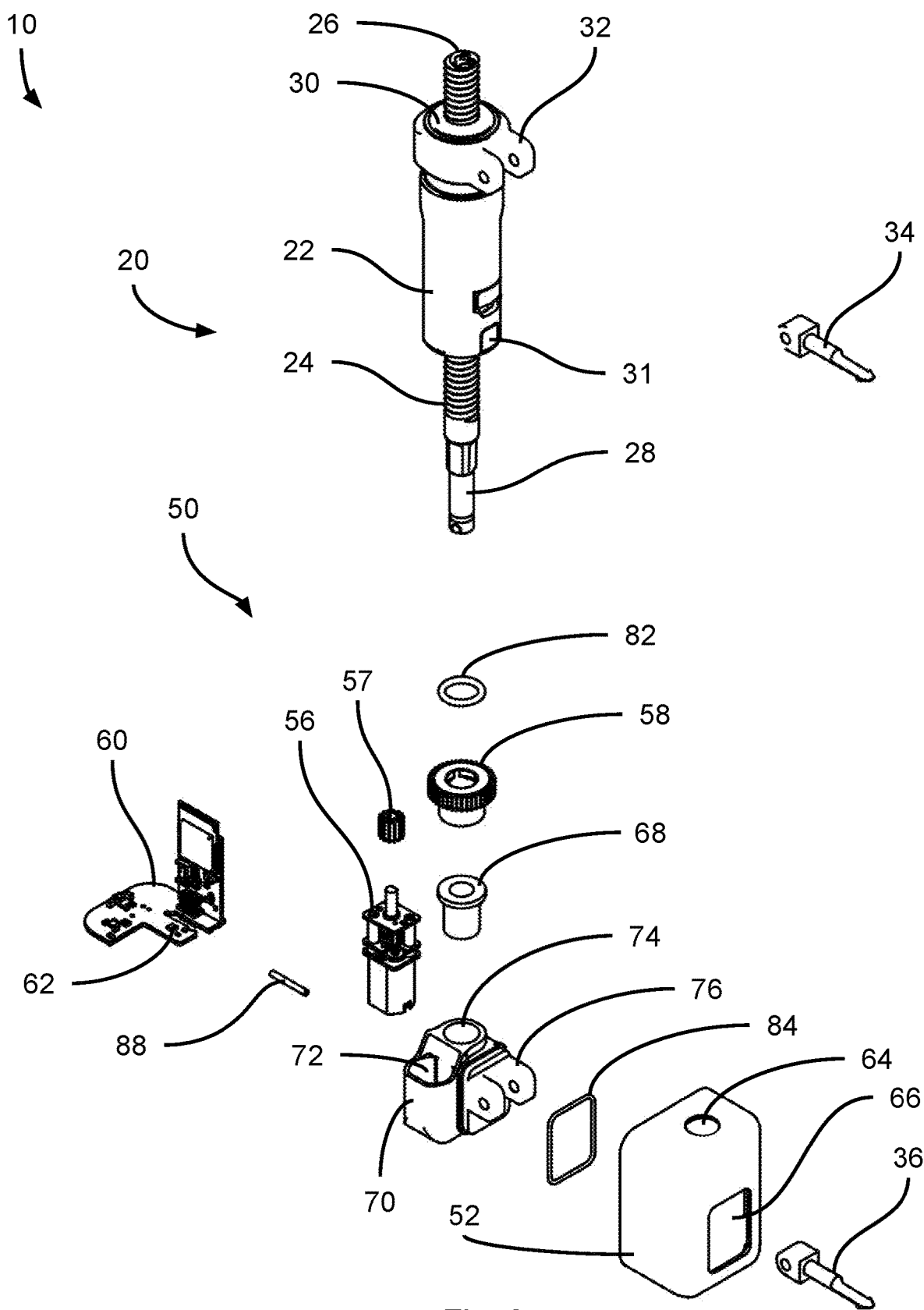
FIG. 2 is an isometric view of the invention showing an exploded view of the control assembly.
Figure 3:
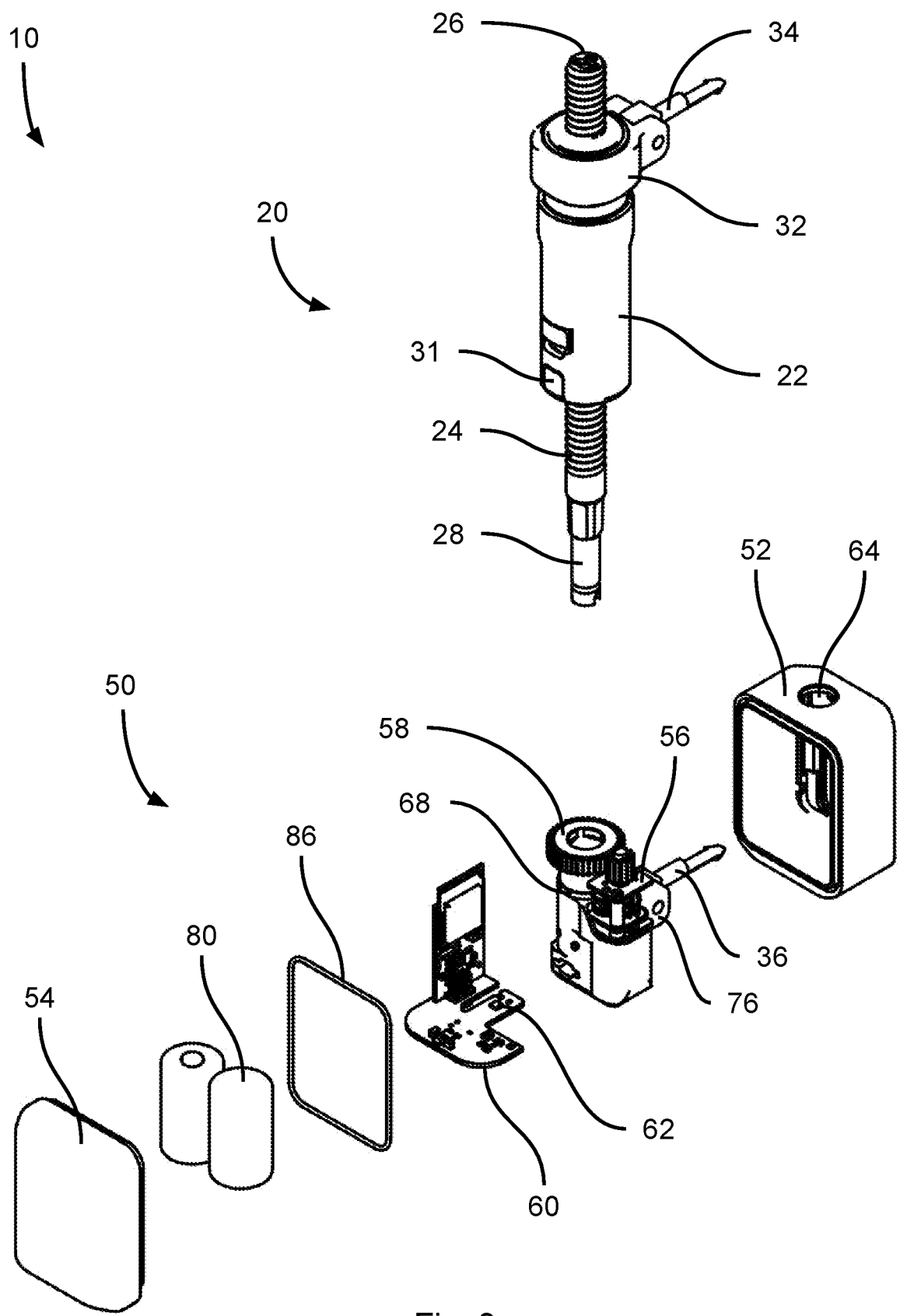
FIG. 3 is an isometric view of the invention showing a partial exploded view of the control assembly.

As seen in FIGS. 2 and 3, control assembly 50 comprises main housing 52 and cover 54 defining first and second holes 64 and 66. Main housing 52 with cover 54 houses motor 56, motor gear 57, main coupling 58, circuit assembly 60, bearing 68, main chassis 70, battery 80, seal 84, and dowel pin 88. Hole 66 may be positioned at the bottom face of main housing 52 or at a face parallel to cover 54.

Circuit assembly 60 comprises angular position sensor 62. Main housing seal 86 is positioned between main housing 52 and cover 54.

Main chassis 70 comprises first and second cavities 72 and 74. Main chassis 70 further comprises lower clevis 76. Lower clevis 76 passes through hole 66 and connects with second connector 36. Cavity 72 receives motor 56.

Control assembly 50 is coupled to lead assembly 20, whereby cavity 74 receives rod lower section 28 and lead screw 24 protrudes from main housing 52 through first hole 64. Rod lower section 28 passes through main coupling 58 and bearing 68, whereby second cavity 74 receives bearing 68 with rod lower section 28. Seal 82 is positioned on main coupling 58.

Lead screw 24 is driven by motor 56 to control the distance between connectors 34 and 36 by engaging lead nut chassis 30. Circuit assembly 60 controls lead assembly 20, specifically lead screw 24 is controlled by microprocessors on circuit assembly 60.

Angular position sensor 62 is mounted axially at a lower extremity of main coupling 58 to measure an angular position of lead screw 24 at rod lower section 28.

Figure 4A:
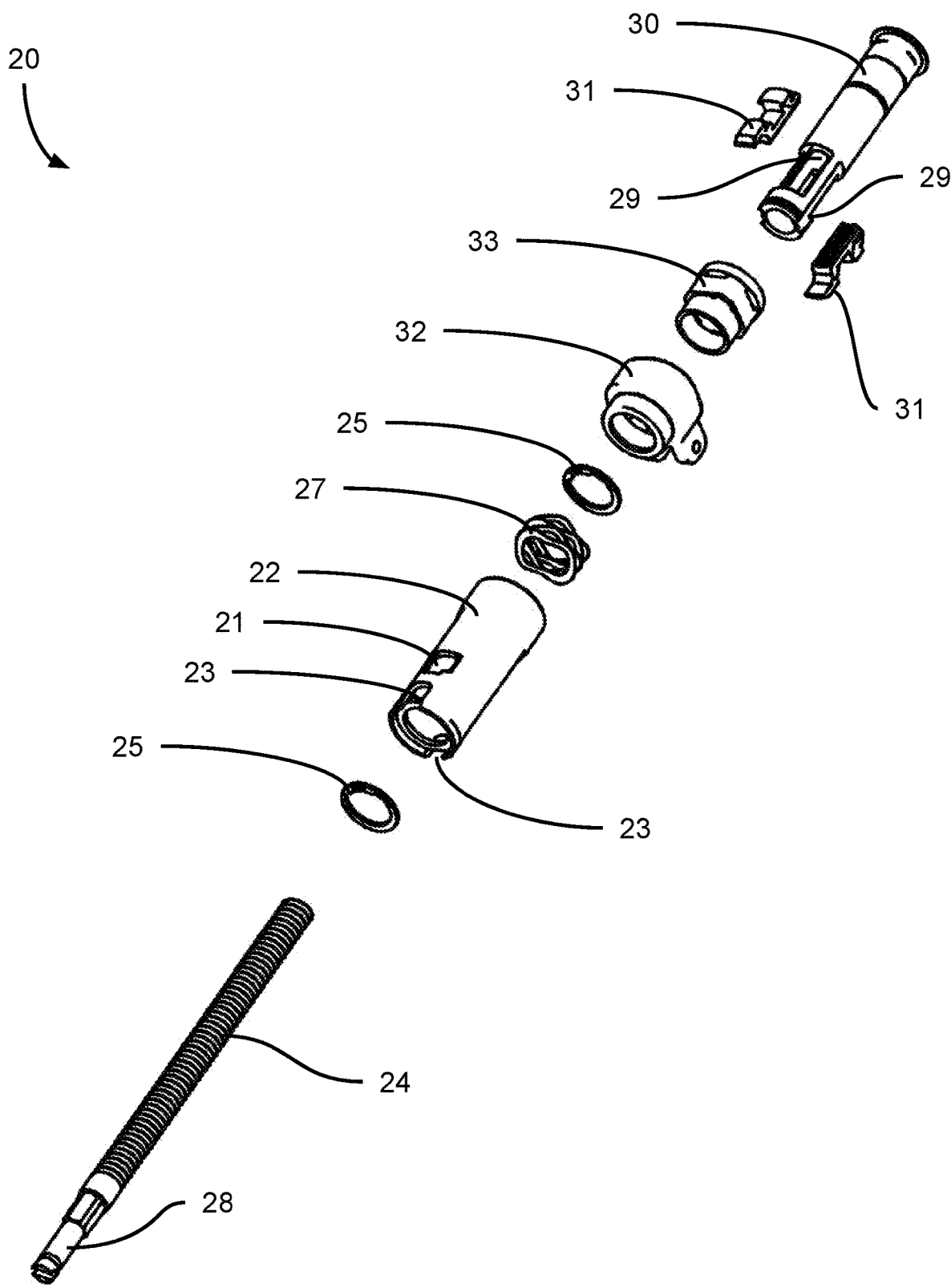
FIG. 4A is an exploded view of the lead assembly.

As seen in FIG. 4A, upper clevis 32 receives detent bearing 33 and lead nut chassis 30. Locking sleeve 22 is coupled to upper clevis 32. First connector 34 is connected to upper clevis 32.

Locking sleeve 22 receives spring 27 and a section of lead nut chassis 30. Locking sleeve 22 comprises first and second holes 21 and first and second apertures 23 to receive first and second lead nut members 31 respectively. Lead nut chassis 30 comprises chassis holes 29.

Figure 4B:
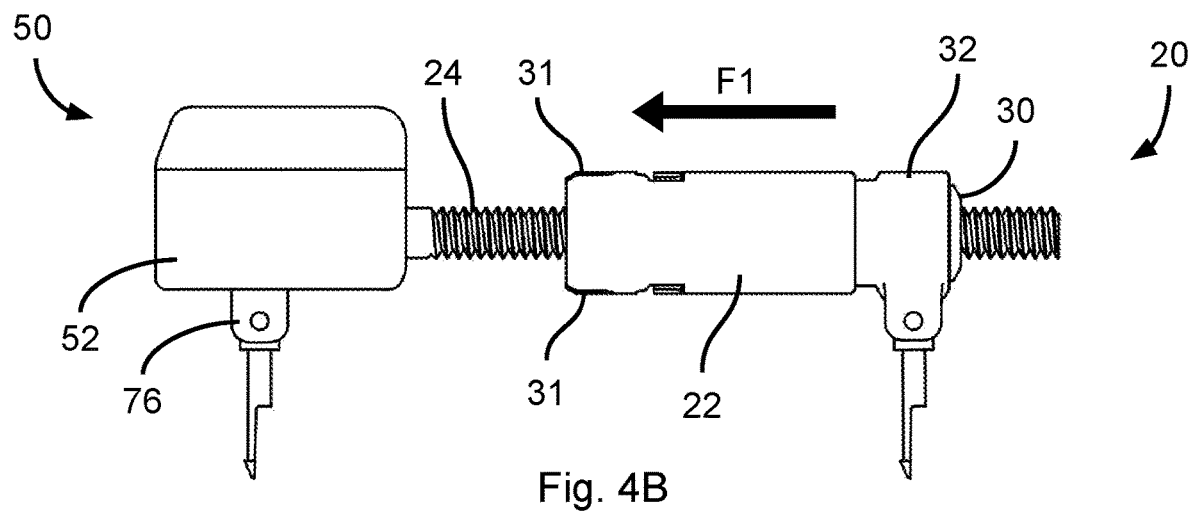
FIG. 4B is a representation of the lead assembly in a locked state.
Figure 4C:
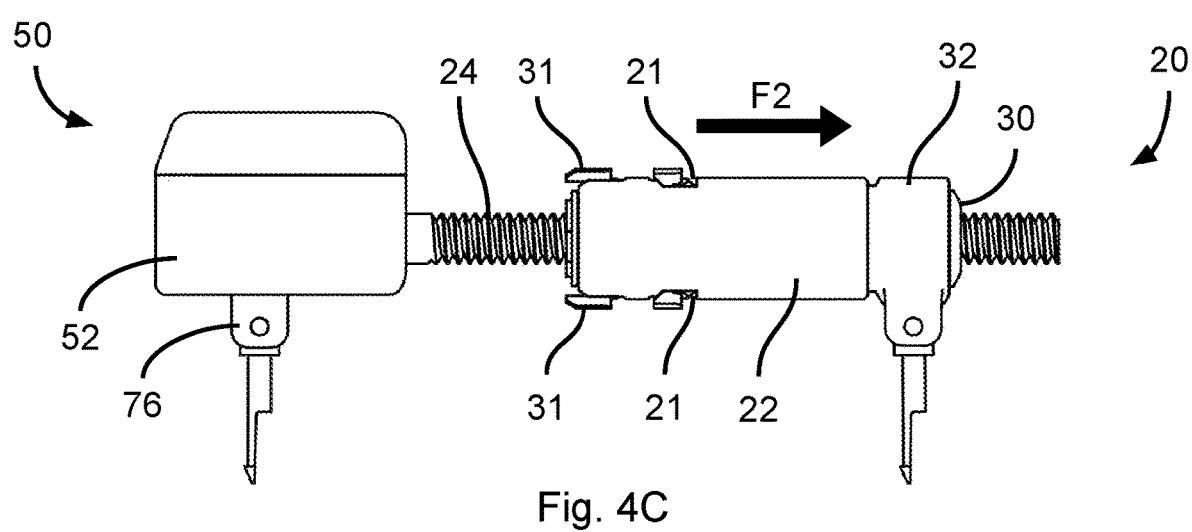
FIG. 4C is a representation of the lead nuts released and lifted to disengage from the lead screw.
Figure 4D:
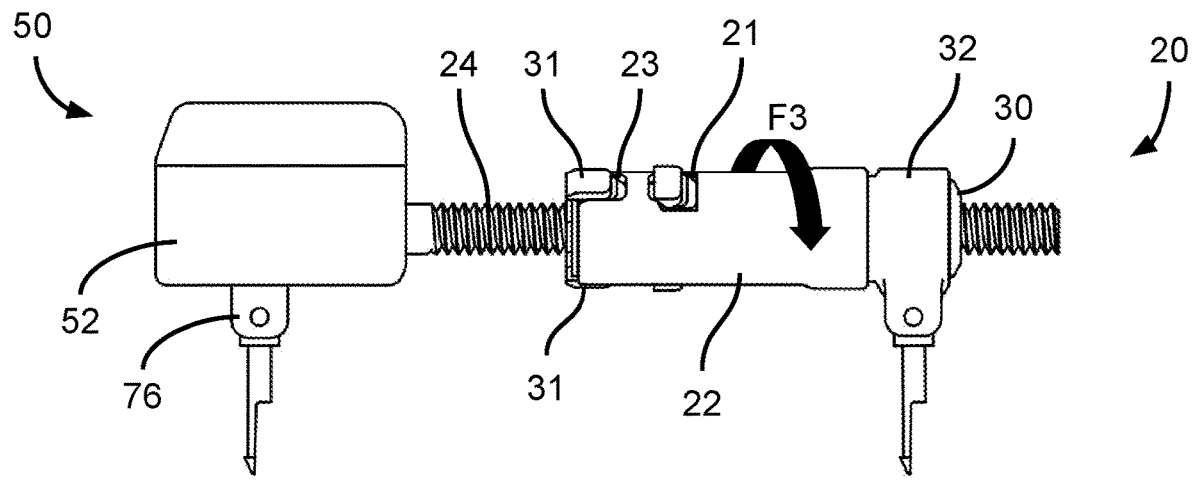
FIG. 4D is a representation of a predetermined force applied by which the locking sleeve is twisted relative to a lead nut chassis to keep the locking sleeve in the disengaged position.

As seen in FIGS. 4B, 4C, and 4D lead nut members 31 interlock with lead screw 24. FIG. 4B shows lead assembly 20 in a locked configuration. In the locked configuration, rotation of lead screw 24 relative to connector 34 results in linear motion. Detent bearing 33 applies a holding force between lead nut chassis 30 and upper clevis 32 so that their relative orientations are fixed. Force F1 is applied to locking sleeve 22 from spring 27. Locking sleeve 22 is positioned over lead nut members 31 such that lead nut members 31 cannot disengage from lead screw 24. Force F2, as seen in FIG. 4C, is user input that may overcome F1, whereupon locking sleeve 22 moves to a position releasing and subsequently lifting lead nut members 31 to disengage from lead screw 24.

Force F3, as seen in FIG. 4D, is a user input, whereby locking sleeve 22 is twisted relative to lead nut chassis 30 to keep locking sleeve 22 in the disengaged position. Applying a force to locking sleeve 22 opposite F3 and releasing, allows spring 27 to force lead nut members 31 back into locked position.

The significance of disengaging lead nut members 31 from lead screw 24 is to freely move lead assembly 20, adjusting length manually. This is done to select a starting point prior to starting a distraction program.

Detent bearing 33 allows lead nut members 31 to be rotated manually relative to both connector 34 and lead screw 24. This is a manual adjustment feature. Detent bearing 33 identify a quarter rotation of lead assembly 20, thereby allowing a manual user to accurately identify each quarter turn. During automated distraction, detent bearing 33 applies enough holding force to generate linear motion from rotation of lead screw 24 only. During manual distraction adjustments, motor 56 seen in FIG. 3, applies enough holding force to generate linear motion from rotation of lead nut members 31 only.

Figure 5A:
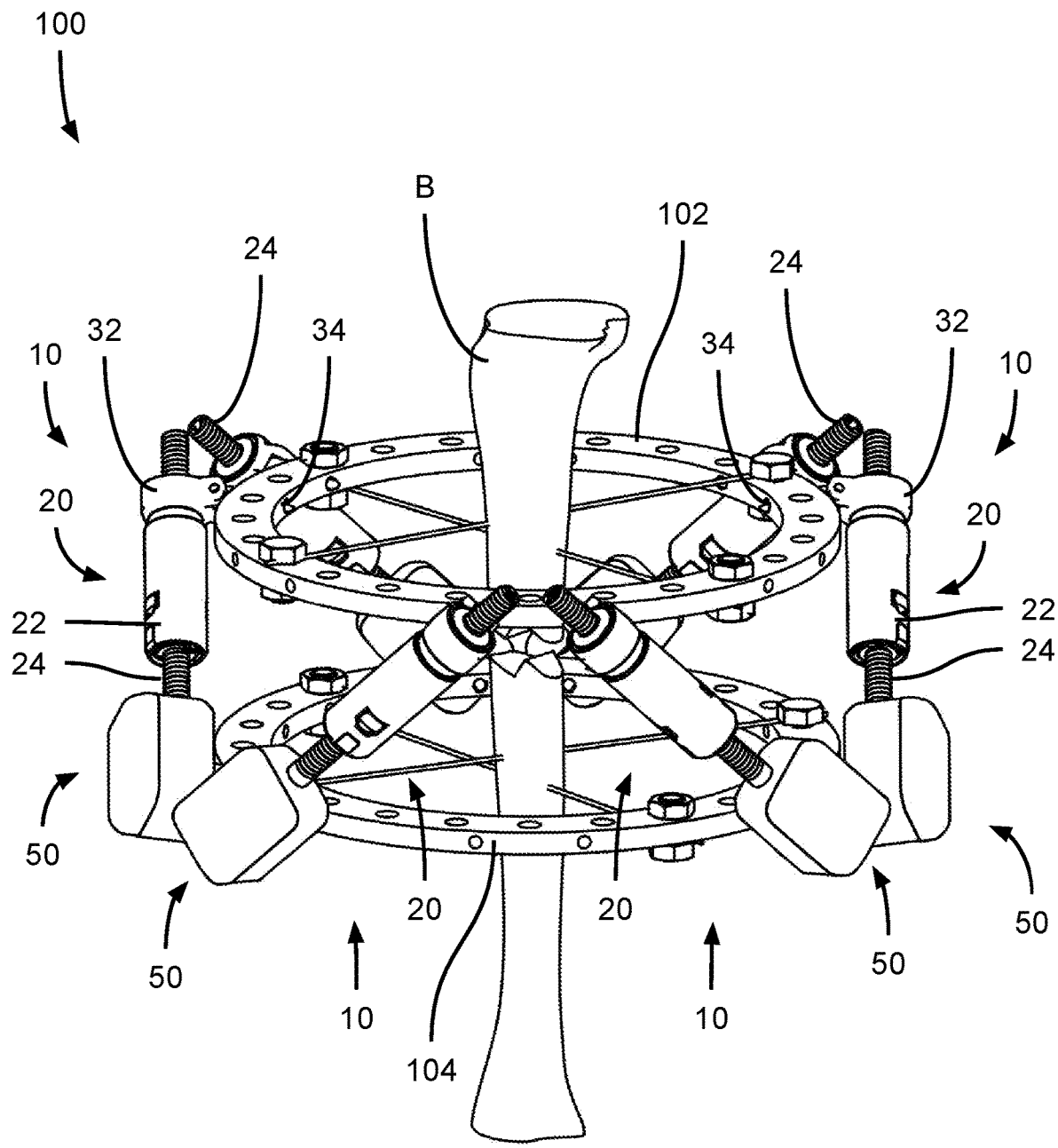
FIG. 5A is an isometric view of the present invention in an an external fixation system.
Figure 5B:
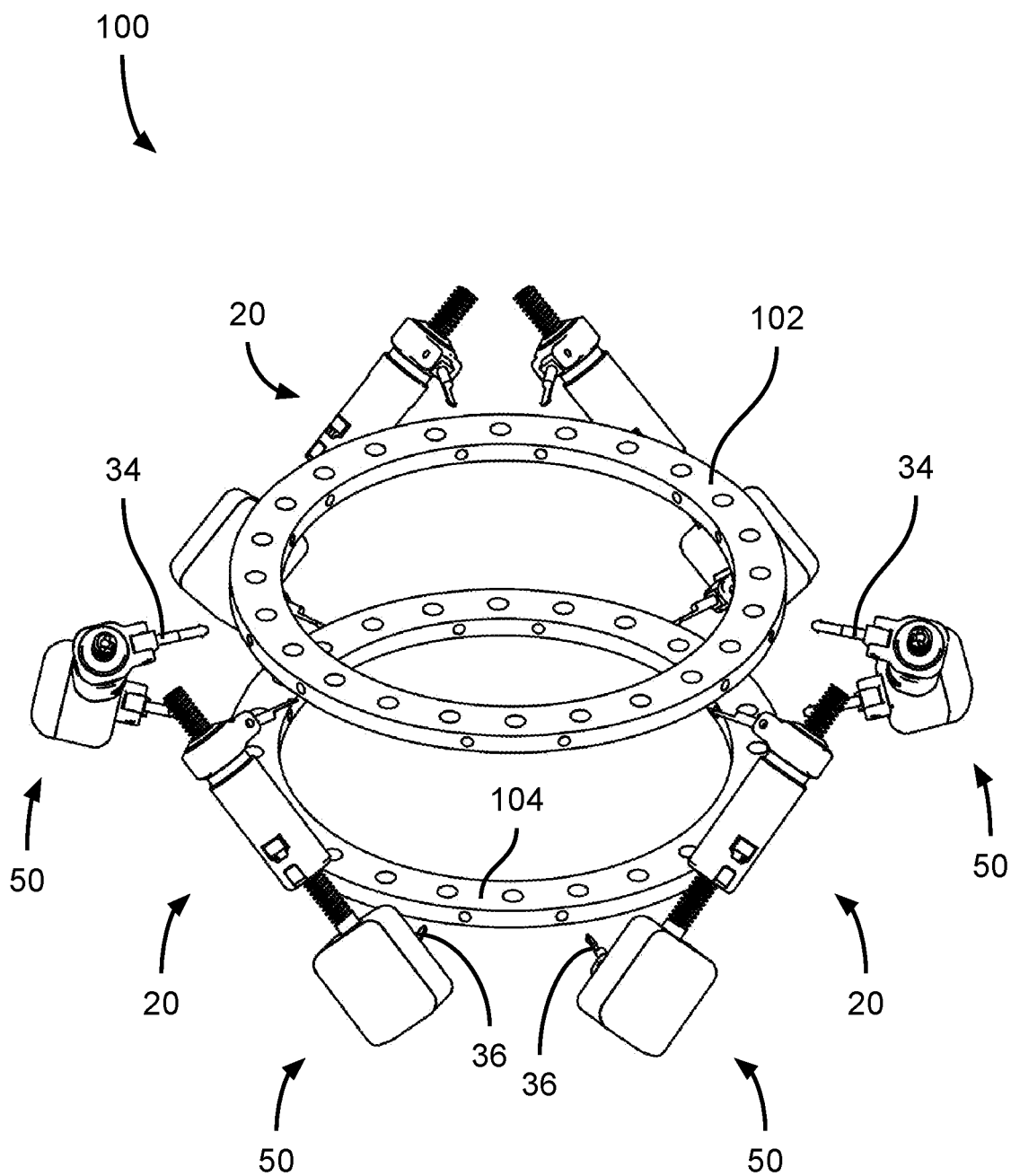
FIG. 5B is an isometric view of the present invention disassembled from the external fixation system.

As seen in FIGS. 5A and 5B, a set of strut assemblies 20 having respective control assembly 50 are part of external fixation system 100. Specifically, a set of six strut assemblies 20, with respective control assembly 50, are connected to first and second rings 102 and 104 through respective first and second connectors 34 and 36, building an intelligent mesh networking schema for monitoring and self-management of strut assemblies 20 on external fixation system 100 via computer device 90, seen in FIGS. 6A and 6B.

Present invention 10 allows to automate external fixation system 100 used for medical distraction of bones. Medical distraction is used for fusions, corrections, and reconstructions of Bones B, with this particular product specializing in feet and ankles. External fixator system 100 attaches to bone B typically in two (or more) places with the ability to move the two bone B sides in all 6 degrees of freedom (6DOF) relative to one another.

In a preferred embodiment, present invention 10 is a single degree of freedom (1 DOF) linear actuator that can move under battery 80, seen in FIG. 3, power and communicating wirelessly.

Figure 6A:
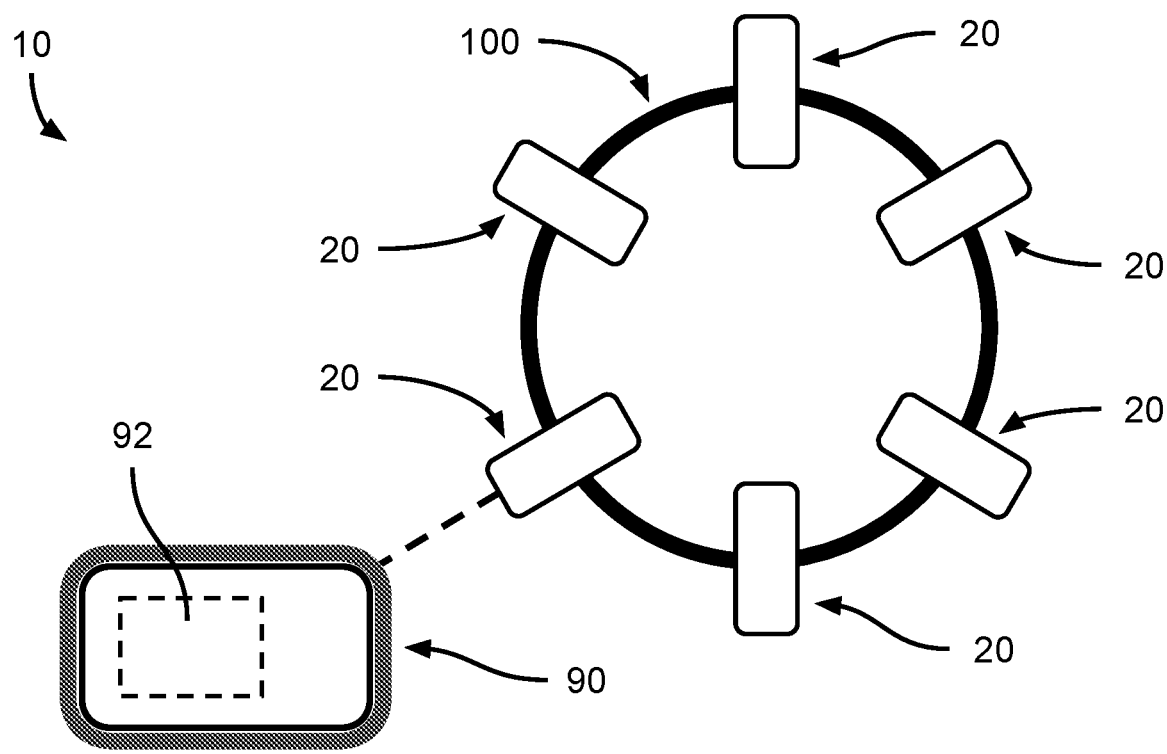
FIG. 6A is a first step of the connection of the strut assembly of the present invention with a computer device.
Figure 6B:
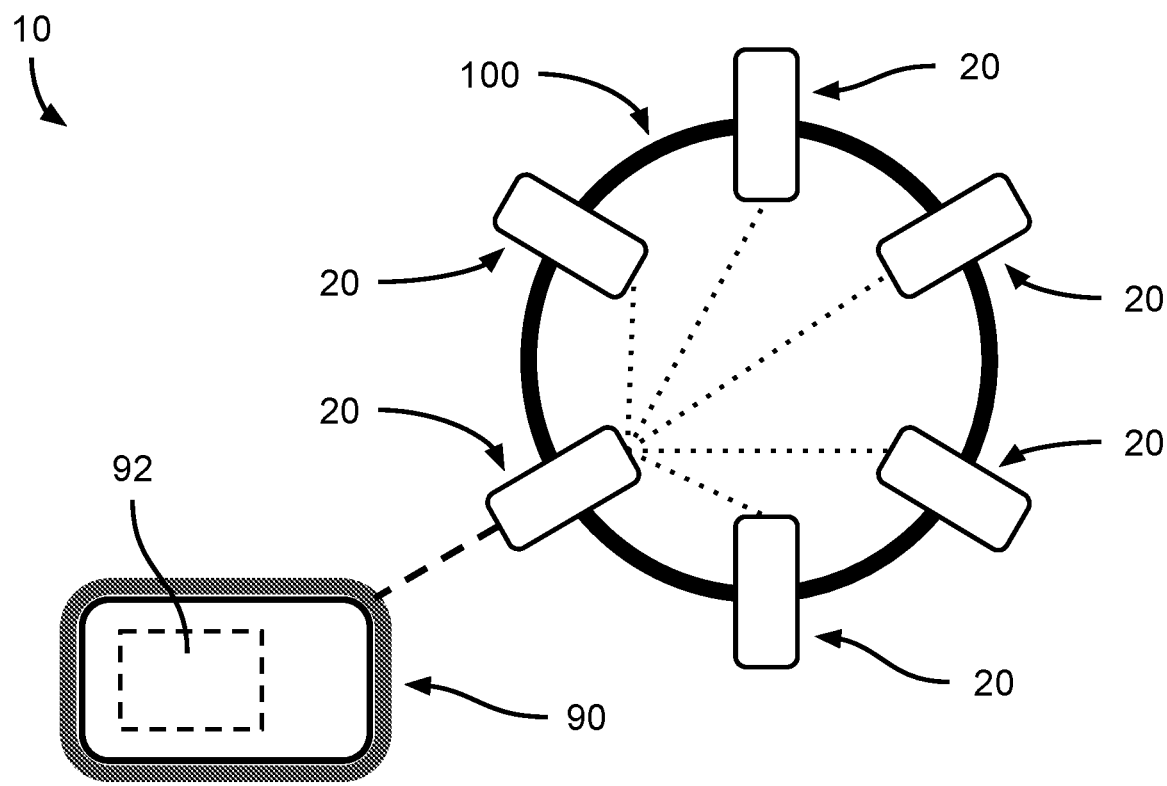
FIG. 6B is a second step of the connection of the strut assembly of the present invention with a computer device.

As seen in FIGS. 5B, 6A, and 6B, computer device 90 is wirelessly connected to control assembly 50. Circuit assembly 60, seen in FIG. 3, connects to computer device 90, whereby angular position sensor 62, allows to automatically control the adjustment of the distance between first and second connectors 34 and 36. Computer device 90 comprises executable application 92, which automatically connects to circuit assembly 60.

Computer device 90 may be any portable or non-portable electronic programable device, including desktop and laptop computers, smartphones, and tablets.

Strut assembly 10 through circuit assembly 60, as seen in FIG. 3, is programed by executable application 92 to make scheduled adjustments automatically for at least 60 days.

Any strut assembly 10 can be the link to mobile device 90 (no single point of failure). In a preferred embodiment, the connection is via lead assembly 20 with least total distraction (for battery life considerations). Total distraction is included in advertising data so that executable application 92 can automatically try to connect to lead assembly 20 with least total distraction.

In a preferred embodiment, network connections are only engaged when an active external computer device 90 is connected.

In step 1, seen in FIG. 6A, an external connection is established first with lead assembly 20 with least total distraction.

In step 2, seen in FIG. 6B, after successfully connecting, internal connections are established to remaining strut assemblies 20.

Each strut assembly 10 is programmed once at the start of treatment by executable application 92 with a set of daily instructions for the entire course of treatment.

Angular position sensor 62 reports accuracy to a fraction of a degree, thus a user can very accurately make changes in 10-degree increments for ⅟₃₆th of a mm adjustments.

Present invention 10 further comprises a wireless microcontroller (MCU) and a motor control loop microcontroller (MCU). Both microcontrollers can read battery voltage. Wireless MCU will keep executable application 92 updated and motor control loop MCU performs a check before attempting to perform a motion adjustment.

The following are required of the present invention 10:
System failsafe must ensure that lead assembly 20 can only move the specified amount at the specified time.
System failsafe trigger a lockdown preventing any movement of the autonomous side of control assembly 50 in the event any anomaly is detected.
System failsafe activates an audible alarm when triggered.
Each automated strut assembly 10 must operate autonomously for a minimum of 60 days without changing battery 80.
Each automated lead assembly 20 will be loaded with a prescribed instruction set for motion to execute over a period of at least 60 days.
Each automated lead assembly 20 have precision and accuracy of at least ⅟₃₆th of a millimeter over the entire period.

Figure 7:
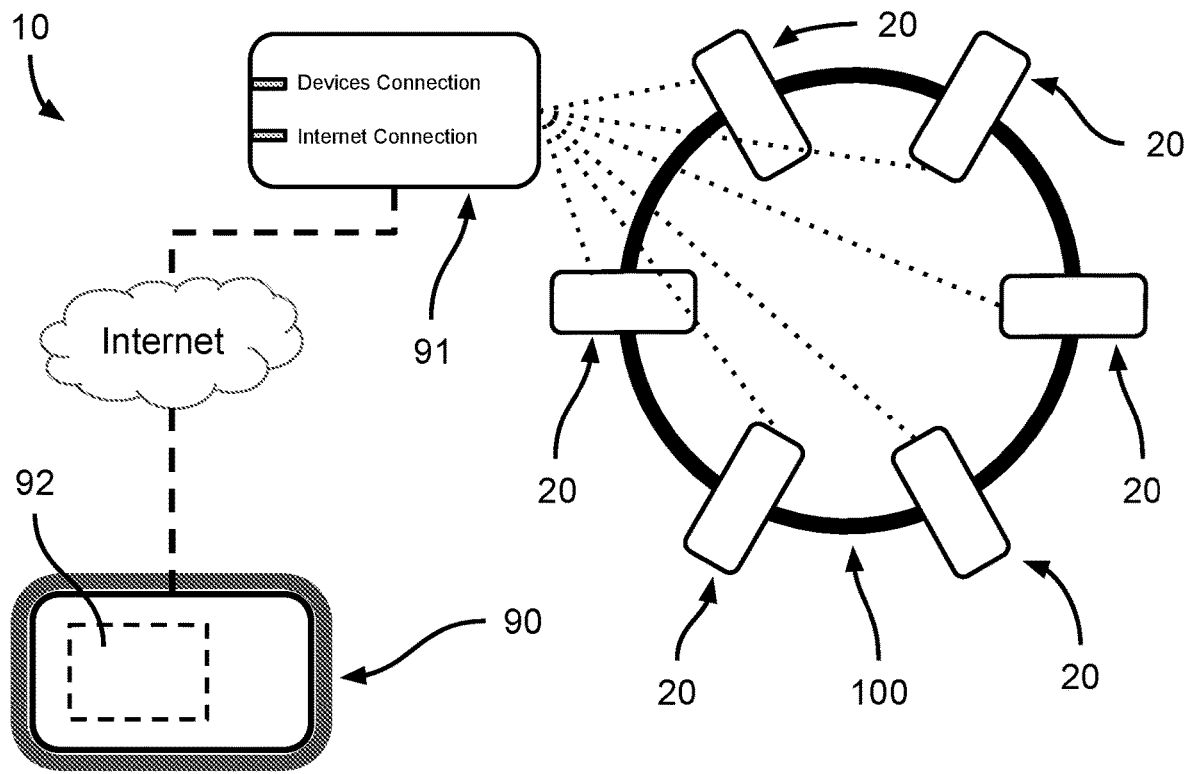
FIG. 7 is a diagram showing an alternative embodiment for the connections between the strut assemblies and the computer device.

As seen in FIG. 7, as an alternative embodiment, an additional network device may be introduced to give the device network remote connectivity.

Present invention 10 may use bridge device 91 and a server for remote connectivity. Computer device 90 can be, for example, at the Doctor Office while patients are using external fixation system 100 as an outpatient.

Figure 8:
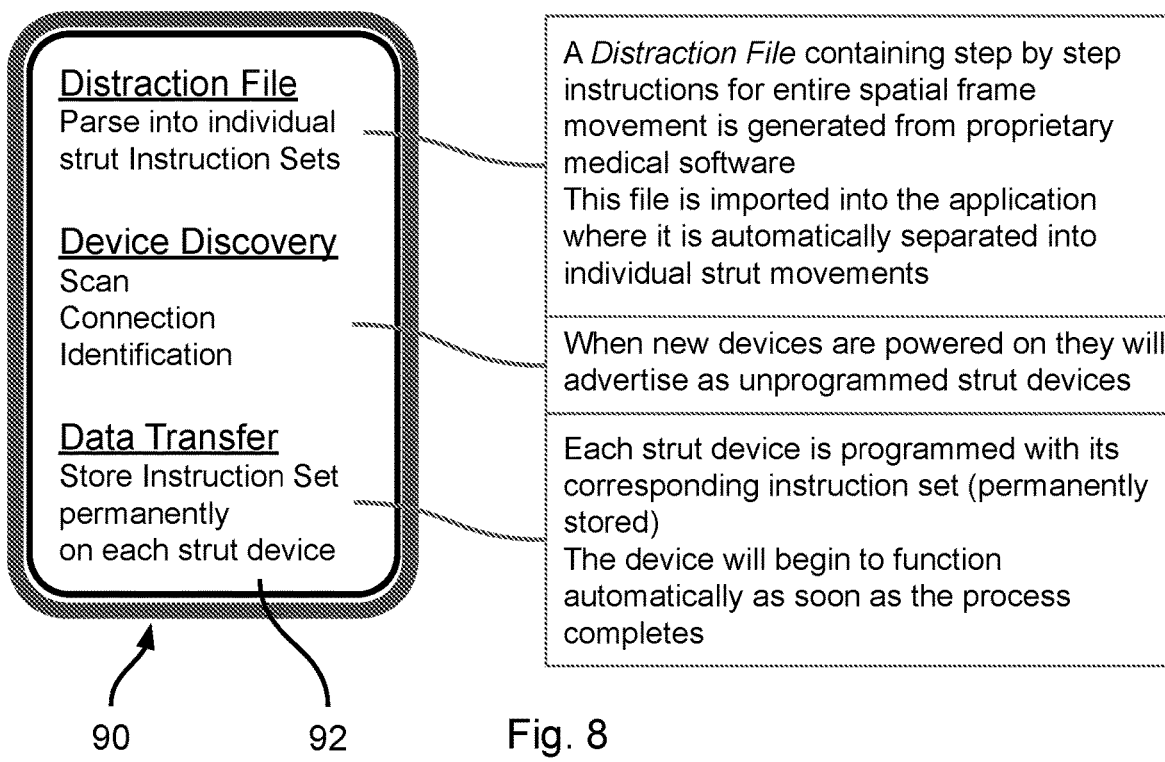
FIG. 8 is a diagram of an algorithm of the present invention.

As seen in FIG. 8, executable application 92 comprises a distraction file containing step by step instructions for entire spatial frame movement that is generated from proprietary medical software. This file is imported into executable application 92 where it is automatically separated into individual strut assemblies 10 movements and stored for each circuit assembly 60, along with other information, such as individual device addresses for each strut assembly 10 and a network identifier for the system of devices.

When new strut assemblies 10 are powered on, they will advertise as unprogrammed strut assemblies.

Executable application 92 connects to a single unprogrammed device and instructs it to identify itself by visual and/or audible means.

Additionally, through executable application 92 a user may select the corresponding instruction set for each strut assembly 10 connected. The data is transmitted to circuit assembly 60 and stored permanently. Strut assembly 10 begin to function automatically as soon as the process completes.

After the programming process completes, strut assembly 10 is no longer programmable. The device automatically connects to executable application 92 on computer device 90 and transmits data related to monitoring device battery level, distraction progress, error codes, etc.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automated wireless strut assembly, comprising:
A) a lead assembly having a locking sleeve and a lead screw that passes through said locking sleeve, said lead assembly further comprises a rod top end, a rod lower section, a lead nut chassis having chassis holes, first and second lead nut members, an upper clevis, a detent bearing, first and second retaining rings, and a spring, a first connector is connected to said upper clevis; and
B) a control assembly coupled to said lead assembly, wherein said control assembly comprises a circuit assembly, said control assembly comprises a main housing and a cover defining first and second holes, said main housing with said cover houses a motor, a main coupling, a bearing, a main chassis, and a battery.

2. The automated wireless strut assembly set forth in claim 1, wherein said upper clevis receives said detent bearing and said lead nut chassis.

3. The automated wireless strut assembly set forth in claim 1, wherein said locking sleeve receive said spring, a section of said lead nut chassis, and attaches to said upper clevis.

4. The automated wireless strut assembly set forth in claim 1, wherein said locking sleeve comprises first and second holes and first and second apertures to receive said first and second lead nut members respectively.

5. The automated wireless strut assembly set forth in claim 1, wherein said lead assembly further comprises a threaded rod having first and second index, an internal rod, and an end stop.

6. The automated wireless strut assembly set forth in claim 1, wherein said circuit assembly comprises an angular position sensor.

7. The automated wireless strut assembly set forth in claim 6, wherein said main chassis comprises first and second cavities, and a lower clevis, whereby said lower clevis passes through said second hole and connects with said second connector.

8. The automated wireless strut assembly set forth in claim 7, wherein said first cavity receives said motor.

9. The automated wireless strut assembly set forth in claim 7, wherein said control assembly is coupled to said lead assembly, whereby said second cavity receives said rod lower section and said lead screw protrudes from said main housing through said first hole.

10. The automated wireless strut assembly set forth in claim 7, wherein said rod lower section passes through said main coupling and said bearing, whereby said second cavity receives said bearing with said rod lower section.

11. The automated wireless strut assembly set forth in claim 7, wherein said upper clevis connected to said first connector and said lower clevis connected to said second connector are aligned with the center axis of said lead screw.

12. The automated wireless strut assembly set forth in claim 7, wherein said upper clevis connected to said first connector and said lower clevis connected to said second connector are off axis with respect to the center axis of said lead screw.

13. The automated wireless strut assembly set forth in claim 7, wherein said lead screw is driven by said motor to control the distance between said first and second connectors by engaging said lead nut chassis.

14. The automated wireless strut assembly set forth in claim 7, wherein said angular position sensor allows to automatically control the adjustment of the distance between said first and second connectors.

15. The automated wireless strut assembly set forth in claim 7, wherein a set of said strut assemblies having said control assembly are connected to first and second rings of an external fixation system through respective said first and second connectors, building a wireless independent networking schema for monitoring and self-management of said strut assemblies on said external fixation system.

16. The automated wireless strut assembly set forth in claim 6, wherein said angular position sensor is mounted axially at a lower extremity of said main coupling to measure an angular position of said lead screw at said rod lower section.

17. The automated wireless strut assembly set forth in claim 1, wherein said circuit assembly controls the movements of said lead screw.

18. The automated wireless strut assembly set forth in claim 1, wherein a computer device automatically connects to said strut assembly through said circuit assembly.

19. The automated wireless strut assembly set forth in claim 18, wherein said lead assembly is programed through said computer device to make scheduled adjustments automatically for at least 60 days.

20. The automated wireless strut assembly set forth in claim 18, wherein further comprises a bridge device for remote connectivity between said computer device and said strut assembly.

21. The automated wireless strut assembly set forth in claim 18, wherein said computer device comprises an executable application having a distraction file containing instructions for entire spatial movements, wherein said distraction file is automatically separated into individual movements of said strut assembly and stored for each of said circuit assembly.

* * * * *